(12) United States Patent
Li et al.

(10) Patent No.: US 12,045,425 B2
(45) Date of Patent: Jul. 23, 2024

(54) DISPLAY STACK WITH MILLIMETER-WAVE ANTENNA FUNCTIONALITY

(71) Applicant: Huawei Technologies Co., Ltd., Guangdong (CN)

(72) Inventors: Linsheng Li, Shenzhen (CN); Chien-Ming Lee, Shenzhen (CN); Yongchao Wang, Xi'an (CN); Cheng Gou, Xi'an (CN); Junyong Zhang, Dongguan (CN); Haiming He, Shenzhen (CN); Hanyang Wang, Reading (GB)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/796,141

(22) PCT Filed: Jan. 29, 2020

(86) PCT No.: PCT/EP2020/052160
§ 371 (c)(1),
(2) Date: Jul. 28, 2022

(87) PCT Pub. No.: WO2021/151483
PCT Pub. Date: Aug. 5, 2021

(65) Prior Publication Data
US 2023/0059699 A1    Feb. 23, 2023

(51) Int. Cl.
*G06F 3/044* (2006.01)
*H01Q 1/22* (2006.01)
(Continued)

(52) U.S. Cl.
CPC .......... *G06F 3/0446* (2019.05); *G06F 3/0443* (2019.05); *G06F 3/0445* (2019.05);
(Continued)

(58) Field of Classification Search
CPC .... G06F 3/0446; G06F 3/0445; G06F 3/0443; G06F 2203/04112
See application file for complete search history.

(56) References Cited

U.S. PATENT DOCUMENTS

| 10,326,196 B2 | 6/2019 | Kim et al. |
| 2011/0193796 A1* | 8/2011 | Cho ................ G06F 3/0412 345/173 |

(Continued)

FOREIGN PATENT DOCUMENTS

| CN | 105446526 A | 3/2016 |
| EP | 3428783 A1 | 1/2019 |
| KR | 20150104509 A | 9/2015 |

*Primary Examiner* — Kevin M Nguyen
(74) *Attorney, Agent, or Firm* — WOMBLE BOND DICKINSON (US) LLP

(57) ABSTRACT

A display stack with millimeter-wave antenna functionality comprising a plurality of adjoining layers, the layers comprising at least a cover layer, a touch sensor panel layer comprising a touch sensor arrangement, and a display panel layer. The touch sensor panel layer comprises a first sensor line grid pattern and a second sensor line grid pattern, the first sensor line grid pattern comprising a plurality of continuous first sensor lines, the second sensor line grid pattern comprising a plurality of continuous second sensor lines. At least a part of the first sensor lines and the second sensor lines are configured to function as radiators for the millimeter wave antenna functionality. This allows providing the millimeter wave antenna in the touch sensor panel structure without the antenna and the touch sensor panel interfering with each other.

20 Claims, 3 Drawing Sheets

(51) Int. Cl.
*H01Q 1/24* (2006.01)
*H01Q 1/44* (2006.01)

(52) U.S. Cl.
CPC ........... *H01Q 1/2266* (2013.01); *H01Q 1/243* (2013.01); *H01Q 1/44* (2013.01); *G06F 2203/04111* (2013.01); *G06F 2203/04112* (2013.01)

(56) References Cited

U.S. PATENT DOCUMENTS

| | | |
|---|---|---|
| 2012/0086669 A1 | 4/2012 | Kim et al. |
| 2015/0255856 A1 | 9/2015 | Hong et al. |
| 2016/0179259 A1* | 6/2016 | Watanabe ............. G06F 3/0446 345/174 |
| 2016/0190678 A1* | 6/2016 | Hong ....................... H01Q 1/44 343/700 MS |
| 2016/0224181 A1 | 8/2016 | Kim et al. |
| 2016/0328057 A1 | 11/2016 | Chai et al. |
| 2017/0139520 A1 | 5/2017 | Yeh et al. |
| 2019/0173160 A1 | 6/2019 | Mow et al. |
| 2019/0220123 A1* | 7/2019 | Kanaya ................. G06F 3/0412 |
| 2019/0361549 A1* | 11/2019 | Gu ........................... G06F 3/044 |

\* cited by examiner

DISPLAY STACK WITH MILLIMETER-WAVE ANTENNA FUNCTIONALITY

CROSS-REFERENCE TO RELATED APPLICATIONS

This application is a National Stage of International Application No. PCT/EP2020/052160, filed on Jan. 29, 2020, which is hereby incorporated by reference in its entirety.

TECHNICAL FIELD

The disclosure relates to a display stack with millimeter-wave antenna functionality, and an electronic device comprising such a display stack.

BACKGROUND

Conventionally, the antennas of an electronic device are arranged outside of the display, such that the display does not interfere with the efficiency and frequency bandwidth of the antenna. However, the movement towards higher and higher display to body ratio of the electronic device, makes the space available for the antennas very limited, forcing either the size of the antennas to be significantly reduced, and its performance impaired, or a large part of the display to be inactive.

Furthermore, electronic devices need to support more and more radio signal technology such as 2G/3G/4G radio. For coming 5G radio technology, high throughput is a one of the properties which need to be fulfilled, requiring large bandwidths, Multiple Input Multiple Output (MIMO), and efficient modulation schemes. The frequency bands will be expanded to cover frequencies up to 6 GHz, as well as millimeter wave bands including 24.2-29.5 GHz and 37-40 GHz, thus requiring the addition of a number of new wide-band antennas in addition to the existing antennas. Millimeter wave antenna systems are required for gigabit-level bandwidths, but the operation distance is limited when compared to sub-6-gigahertz radio systems.

Prior art solutions utilize regions of the touch sensor panel layer to accommodate the millimeter wave antenna. In these regions, the touch panel sensor lines are cut off, which affects the touch function. The regions that comprise cut off sensor lines will have no touch function at all or with decreased performance, leaving the display non-user-friendly.

SUMMARY

It is an object to provide an improved display stack with millimeter-wave antenna functionality. The foregoing and other objects are achieved by the features of the independent claims. Further implementation forms are apparent from the dependent claims, the description, and the figures.

According to a first aspect, there is provided a display stack with millimeter-wave antenna functionality comprising a plurality of adjoining layers, the layers comprising at least a cover layer, a touch sensor panel layer comprising a touch sensor arrangement, a display panel layer, the touch sensor panel layer comprising a first sensor line grid pattern and a second sensor line grid pattern, the first sensor line grid pattern comprising a plurality of continuous first sensor lines, the second sensor line grid pattern comprising a plurality of continuous second sensor lines, at least a part of the first sensor lines and the second sensor lines being configured to function as radiators for the millimeter wave antenna functionality.

Such a display stack allows the touch sensor arrangement to be reused as millimeter wave antenna radiators without adding any additional parts to the touch sensor panel layer, and without decreasing the overall transmittance of display side of an electronic device due to adding extra antennas. This allows providing the millimeter wave antenna in the touch sensor panel structure without the antenna and the touch sensor panel interfering with each other.

In an embodiment, the first sensor lines form transmission lines of the touch sensor arrangement, the transmission lines extending substantially in a first direction, and the second sensor lines form receiver lines of the touch sensor arrangement, the receiver lines extending substantially in a second direction, the second direction extending at an angle>0° to the first direction. This allows the touch sensor arrangement to accommodate the millimeter wave antenna without affecting the touch function.

In an embodiment, the first sensor lines extend at least partially nonlinearly in the first direction such that distances between adjacent first sensor lines vary periodically along the first direction. By keeping the original touch sensor arrangement elements the same, except for some of the lines in the antenna area having reduced widths, there will be no significant loss in touch sensitivity while still providing good isolation to the millimeter wave signals.

In an embodiment, a nonlinear section of the first sensor line is at least diagonal, comprising at least two sections extending at an angle to the first direction, the angle preferably being 45°. The shape of the transmission line is optimized to achieve the best touch sensor panel performance and the best antenna performance simultaneously.

In an embodiment, the first sensor line grid pattern and a second sensor line grid pattern form a single layer conductive mesh.

In an embodiment, each second sensor line comprises a plurality of individual receiver units, two adjacent receiver units of one second sensor line being interconnected by a conductive bridge. The bridge will work as a direct link for touch sensor panel signals between different receiver units, but block the millimeter wave signals from passing.

In an embodiment, each receiver unit of one second sensor line is connected to a feed line.

In an embodiment, the feed line comprises a conductive or inductive coupling to the receiver unit. By not connecting the feed line directly to the receiver unit, but maintaining a small gap therebetween, there will be a feed for the millimeter wave antenna, while still avoiding interference between touch sensor panel signals and millimeter wave signals, since the touch sensor panel signals are usually of much lower frequencies.

In an embodiment, the receiver unit has a polygonal shape, the polygon being symmetrical in the first direction and the second direction. The shape of the receiver unit is optimized to achieve the best touch sensor panel performance and the best antenna performance simultaneously.

In an embodiment, the receiver unit is at least quadrilateral, comprising at least two sections extending at an angle to the first direction and the second direction, the angle preferably being 45°, facilitating a pattern which is relatively easy to manufacture yet still allows as much effective areas as possible for the touch function as well as the antenna radiators.

In an embodiment, the first sensor line grid pattern and the second sensor line grid pattern form a dual layer conductive mesh, the first sensor line grid pattern and the second sensor line grid pattern being separated by an insulation substrate layer in a third direction perpendicular to the first direction and the second direction.

In an embodiment, the second sensor line grid pattern is arranged adjacent the cover layer, and the first sensor line grid pattern is arranged adjacent the display panel layer.

In an embodiment, the second sensor lines extend at least partially nonlinearly in the second direction such that distances between adjacent second sensor lines vary periodically along the second direction. By keeping the original touch sensor arrangement elements the same, except for some of the lines in the antenna area having reduced widths, there will be no significant loss in touch sensitivity while still providing good isolation to the millimeter wave signals.

In an embodiment, a non-linear section of the second sensor line is at least diagonal, comprising at least two sections extending at an angle to the second direction, the angle preferably being 45°.

In an embodiment, the non-linear sections of the first sensor lines comprise dummy areas isolating adjacent first sensor lines from each other, and/or the non-linear sections of the second sensor lines comprise dummy areas isolating adjacent second sensor lines from each other, the dummy area(s) being configured to accommodate millimeter wave antenna elements, enhancing the radiation efficiency.

In an embodiment, the display stack does not comprise a separate millimeter-wave antenna layer. Any additional antenna layers will cause a lower light transmittance level since the additional antenna layer will give a light transmittance level lower than 100%. A lower light transmittance level in the display stack will lead to either a reduction in luminance level or higher power consumption, both of which are critical disadvantages in the eyes of a user.

In an embodiment, the display stack further comprises a parasitic or coupled radiator layer arranged between the cover layer and the touch sensor panel layer, the radiator layer comprising transparent conductive mesh, enhancing the antenna performance by extending the working bandwidth, increasing the radiating gain, etc.

In an embodiment, a section of the cover layer, facing the touch sensor panel layer, is configured to accommodate the radiators of the millimeter wave antenna functionality, reducing the necessary height of the display stack.

According to a second aspect, there is provided an electronic device comprising a display stack according to the above.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 4b shows a schematic cross-sectional view of the embodiment of FIG. 4a;

FIG. 5b shows the second sensor line grid pattern of the embodiment of FIG. 5a.

DETAILED DESCRIPTION

Figure 1A:
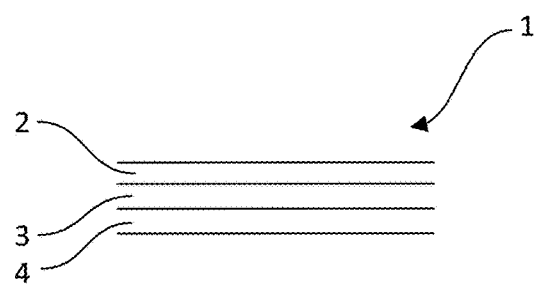
FIGS. 1a and 1b show schematic cross-sectional views of display stacks in accordance with two embodiments of the present disclosure.
Figure 1B:
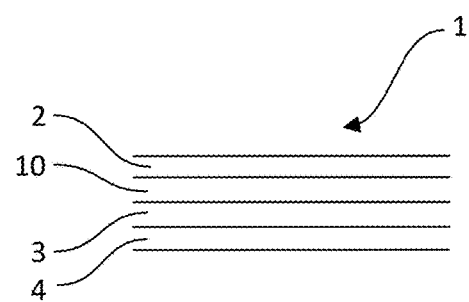

FIGS. 1a and 1b show a display stack 1 with millimeter-wave antenna functionality. The display stack 1 comprises a plurality of adjoining layers, at least a cover layer 2, a touch sensor panel layer 3 comprising a touch sensor arrangement (not shown), and a display panel layer 4.

The touch sensor panel layer 3 comprises a first sensor line grid pattern 5 and a second sensor line grid pattern 6, shown in more detail in FIGS. 2 to 5b. The first sensor line grid pattern 5 comprises a plurality of continuous first sensor lines 5a, and the second sensor line grid pattern 6 comprises a plurality of continuous second sensor lines 6a. By continuous means that each first sensor lines 5a and each second sensor lines 6a is integral and uninterrupted as it extends across the first sensor line grid pattern 5 and a second sensor line grid pattern 6, respectively. At least a part of the first sensor lines 5a and the second sensor lines 6a are configured to function as radiators for the millimeter wave antenna functionality.

The first sensor lines 5a form the transmission lines of the touch sensor arrangement and extend substantially in a first direction D1. The second sensor lines 6a form the receiver lines of the touch sensor arrangement and extend substantially in a second direction D2. The second direction D2 extends at an angle>0° to the first direction D1, the angle being, for example, 90° as indicated in the Figs.

The first sensor lines 5a may extend at least partially nonlinearly in the first direction D1 such that distances between adjacent first sensor lines 5a vary periodically along the first direction D1.

Figure 2:
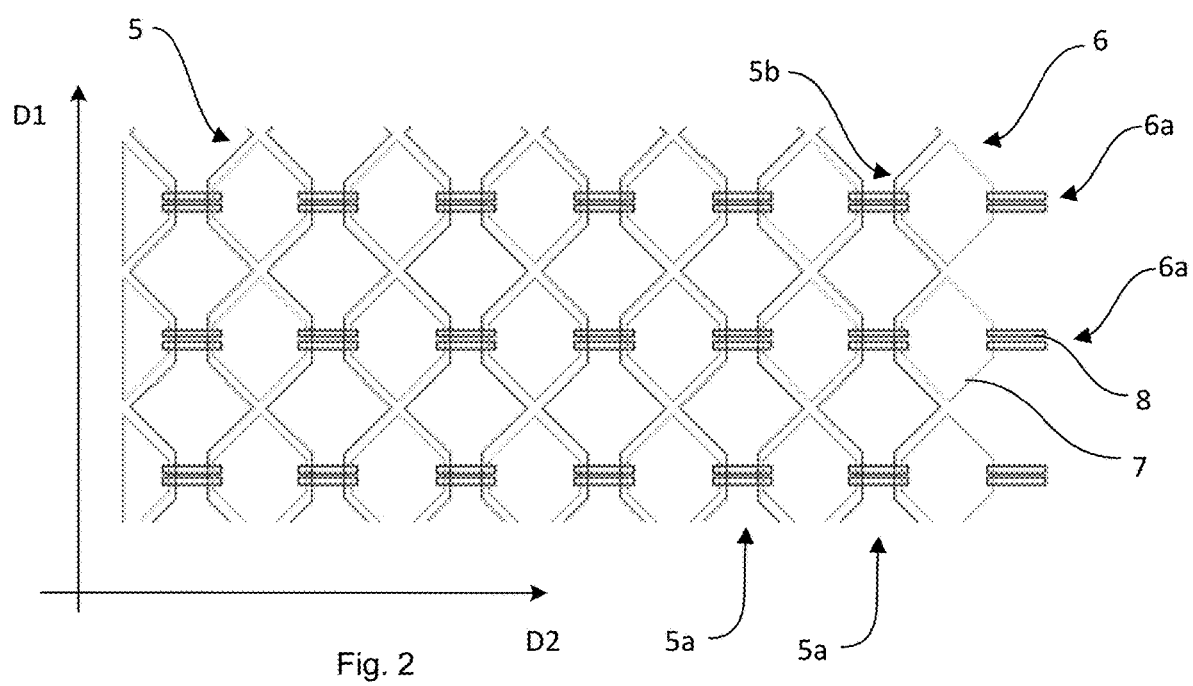
FIG. 2 shows a schematic top view of a touch sensor panel layer in accordance with an embodiment of the present disclosure.
Figure 3:
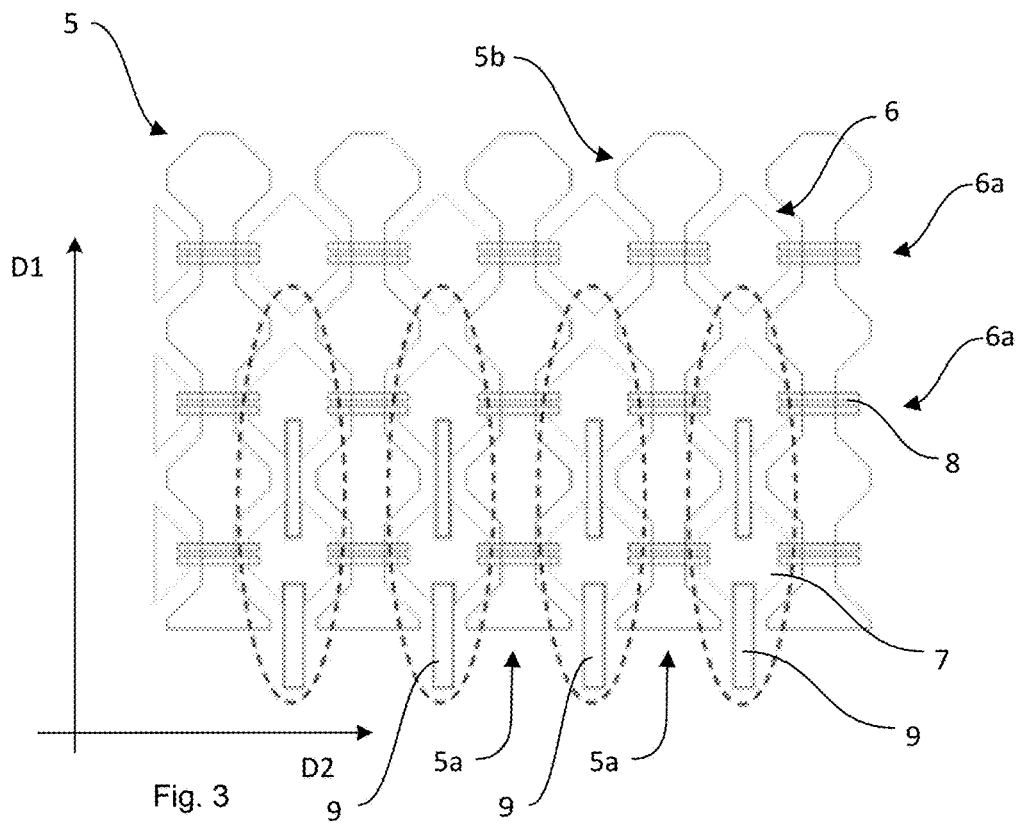
FIG. 3 shows a schematic top view of a touch sensor panel layer in accordance with an embodiment of the present disclosure.
Figure 4A:
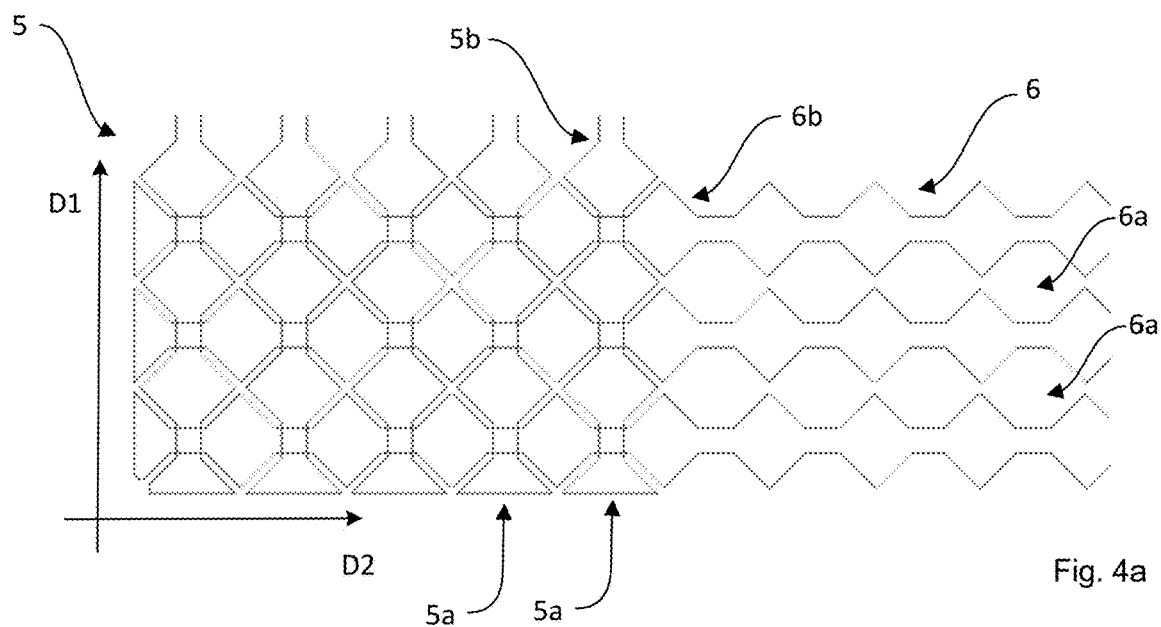
FIG. 4a shows a schematic top view of a touch sensor panel layer in accordance with an embodiment of the present disclosure.
Figure 5A:
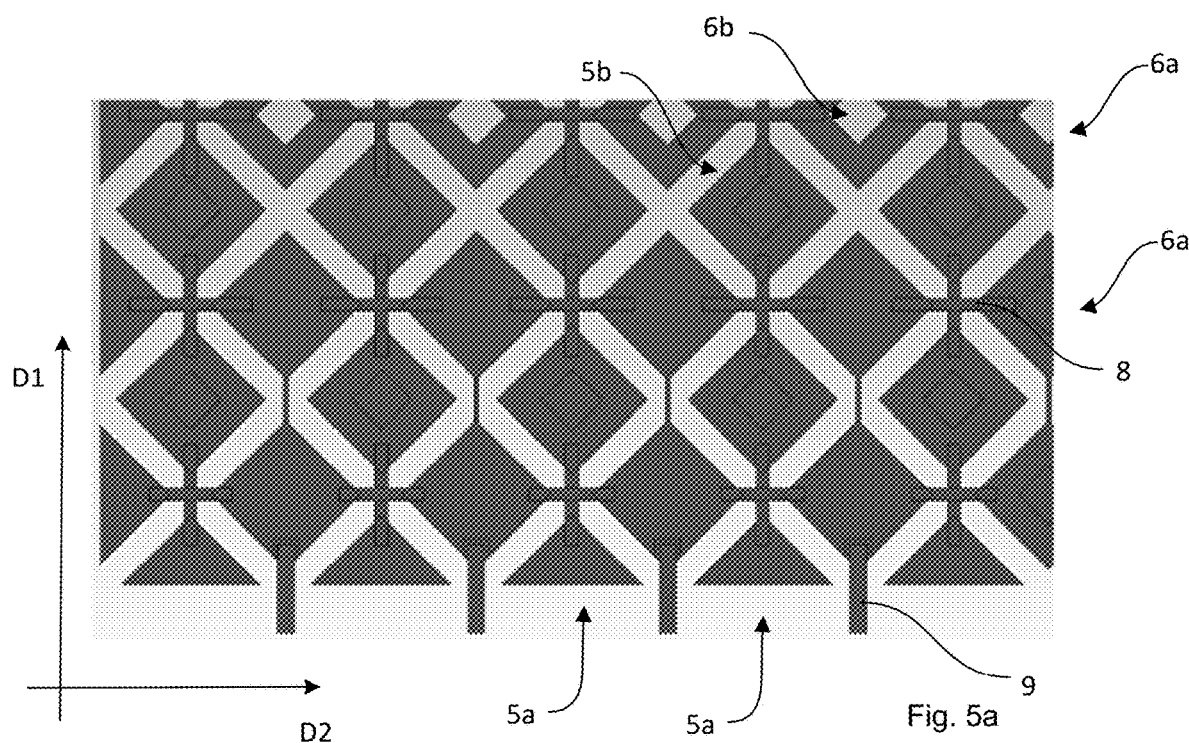
FIG. 5a shows a schematic top view of a touch sensor panel layer in accordance with an embodiment of the present disclosure.

The nonlinear section 5b of the first sensor line 5a may be at least diagonal, i.e., comprise at least two sections extending at an angle to each other and to the first direction D1, the angle preferably being 45° as shown in FIGS. 2, 4a, and 5a. The nonlinear section 5b may also comprise three sections extending at angles to each other. As shown in FIG. 3, two sections may be arranged such that they extend at a 45° angle to the first direction D1, and are separated by a third section extending in parallel with the first direction D1. The nonlinear section 5b may also have any other suitable, polygonal shape.

The first sensor line grid pattern 5 and a second sensor line grid pattern 6 may be arranged such that they form a single layer conductive mesh, as shown in FIGS. 2 and 3.

In such an embodiment, each second sensor line 6a may comprise a plurality of individual receiver units 7. Two adjacent receiver units 7 of one single second sensor line 6a are interconnected by a conductive bridge 8, as shown in FIGS. 2, 3, and 5a.

The receiver unit 7 may have a polygonal shape, the polygon being symmetrical in both the first direction D1 and the second direction D2. The receiver unit 7 may be at least quadrilateral, comprising at least two sections extending at an angle to the first direction D1 and the second direction D2, the angle preferably being 45°. The receiver unit 7 may also be hexagonal, such that four sections are be arranged at 45° angles to the first direction D1, and two sections extend in parallel with the first direction D1. The receiver unit 7 may also have any other suitable, polygonal shape.

Each receiver unit 7 of one single second sensor line e 6a may be connected to a feed line 9. The feed line 9 may comprise a conductive or inductive coupling to the receiver unit 7.

Figure 4B:
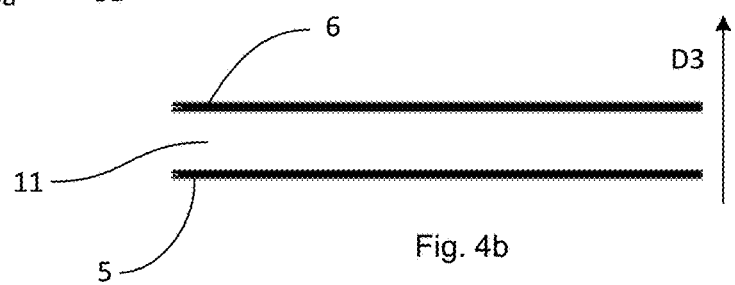

The first sensor line grid pattern 5 and the second sensor line grid pattern 6 may also form a dual layer conductive mesh, as shown in FIGS. 4a, 4b, 5a, and 5b. In such an embodiment, the first sensor line grid pattern 5 and the second sensor line grid pattern 6 are separated by an insulation substrate layer 11 in a third direction D3 perpendicular to the first direction D1 and the second direction D2, as shown in FIG. 4b. The insulation substrate layer 11 may comprise of cyclic olefin polymer (COP) film.

The second sensor line grid pattern 6 may be arranged adjacent the cover layer 2, and the first sensor line grid pattern 5 arranged adjacent the display panel layer 4. The second sensor lines 6a may extend at least partially nonlinearly in the second direction D2 such that distances between adjacent second sensor lines 6a vary periodically along the second direction D2.

Figure 5B:
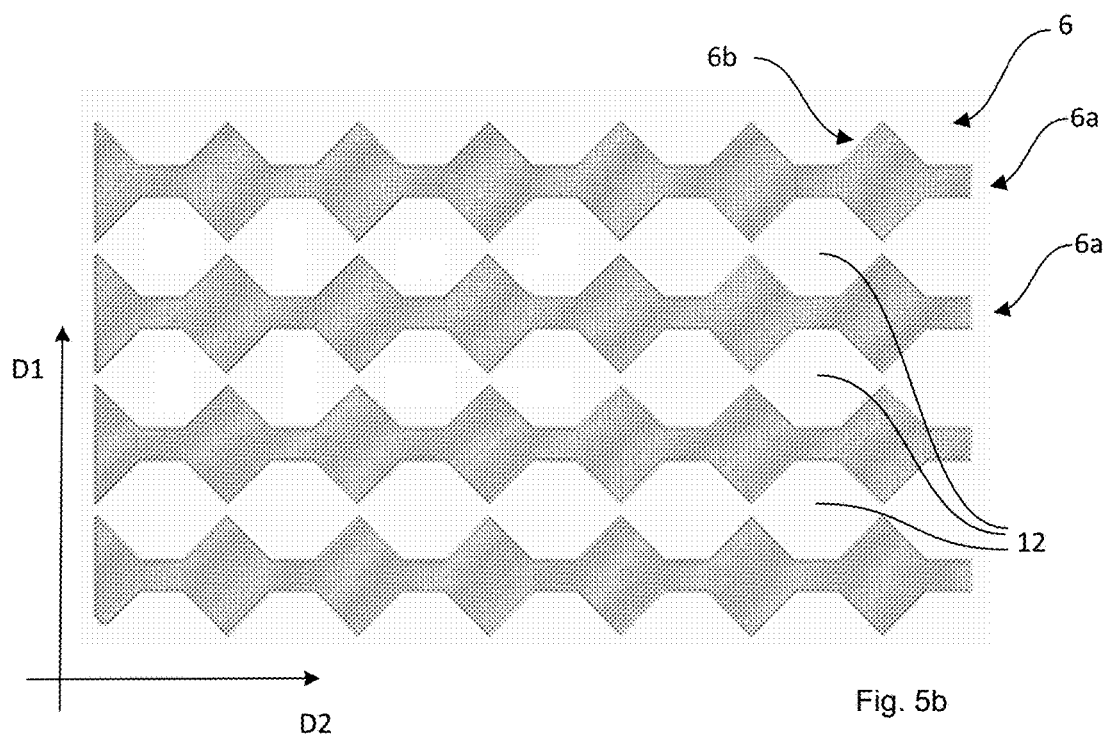

The non-linear section 6b of the second sensor line 6a may be at least diagonal, i.e., comprise at least two sections extending at an angle to each other and to the second direction D2, the angle preferably being 45° as shown in FIG. 5b. The nonlinear section 6b may also comprise three sections extending at angles to each other. As shown in FIG. 4a, two sections may be arranged such that they extend at a 45° angle to the second direction D2, and are separated by a third section extending in parallel with the second direction D2. The nonlinear section 6b may also have any other suitable, polygonal shape.

As shown in FIG. 5b, the non-linear sections 5b of the first sensor lines 5a may comprise dummy areas 12 isolating adjacent first sensor lines 5a from each other. Correspondingly, the non-linear sections 6b of the second sensor lines 6a may comprise dummy areas 12 isolating adjacent second sensor lines 6a from each other. The dummy areas 12 are configured to accommodate millimeter wave antenna elements.

In one embodiment, the display stack 1 does not comprise a separate millimeter-wave antenna layer. Any additional antenna layers, other than the touch sensor panel layer 3, will cause a lower light transmittance level since the additional antenna layer will give a light transmittance level lower than 100%. A lower light transmittance level in the display stack 1 will lead to either a reduction in luminance level or higher power consumption, both of which are critical disadvantages in the eyes of a user.

The display stack 1 may further comprise a parasitic or coupled radiator layer 10 arranged between the cover layer 2 and the touch sensor panel layer 3, as shown in FIG. 1b. The radiator layer 10 comprises transparent conductive mesh. The radiator layer 10 may also be integrated with a layer arranged above the touch sensor panel layer, including but not restricted to the bottom surface of the cover layer.

A section of the cover layer 2, facing the touch sensor panel layer 3, may be configured to accommodate the radiators of the millimeter wave antenna functionality (not shown).

The present invention also relates to an electronic device comprising a display stack 1 according to the above. The electronic device may be, for example, a smartphone, a laptop computer, or a tablet computer.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A display stack with millimeter-wave antenna functionality, comprising:
   a plurality of adjoining layers, the layers comprising
      a cover layer,
      a display panel layer, and
      a touch sensor panel layer comprising a touch sensor arrangement, wherein the touch sensor panel layer comprises:
         a first sensor line grid pattern, the first sensor line grid pattern comprising a plurality of continuous first sensor lines, wherein each first sensor line is integral and uninterrupted as it extends, at least partially nonlinearly, across the first sensor line grid pattern, and
      a second sensor line grid pattern, the second sensor line grid pattern comprising a plurality of continuous second sensor lines, wherein each second sensor line is integral and uninterrupted as it extends, at least partially nonlinearly, across the second sensor line grid pattern, wherein the first sensor lines form transmission lines of the touch sensor arrangement, the transmission lines extending substantially in a first direction, wherein the second sensor lines form receiver lines of the touch sensor arrangement, the receiver lines extending substantially in a second direction, wherein the first sensor lines and the second sensor lines are separated by an insulation substrate layer comprising a polymer film, and
         wherein antenna sections including the receiver lines and the transmission lines are integral in the touch sensor arrangement; wherein each of the antenna sections including the receiver lines and the transmission lines connected to a feed line configured to function as radiators for the millimeter wave antenna functionality, wherein the receiver lines and the transmission lines are separated by the insulation substrate layer comprising the polymer film.

2. The display stack according to claim 1, wherein
the second direction extending at an angle>0° to the first direction.

3. The display stack according to claim 1, wherein the first sensor lines extend at least partially nonlinearly in the first direction such that distances between adjacent first sensor lines vary periodically along the first direction.

4. The display stack according to claim 3, wherein a nonlinear section of the first sensor lines is at least diagonal, comprising at least two sections extending at an angle to the first direction, the angle preferably being 45°.

5. The display stack according to claim 1, wherein the first sensor line grid pattern and a second sensor line grid pattern form a single layer conductive mesh.

6. The display stack according to claim 5, wherein each second sensor line comprises a plurality of individual receiver units, two adjacent receiver units of one second sensor line being interconnected by a conductive bridge.

7. The display stack according to claim 6, wherein each receiver unit of one second sensor line is connected to a feed line.

8. The display stack according to claim 7, wherein the feed line comprises a conductive or inductive coupling to the receiver unit.

9. The display stack according to claim 6, wherein each receiver unit has a polygonal shape, the polygon being symmetrical in the first direction and the second direction.

10. The display stack according to claim 9, wherein the receiver unit is at least quadrilateral, comprising at least two sections extending at an angle to the first direction and the second direction, the angle preferably being 45°.

11. The display stack according to claim 1, wherein the first sensor line grid pattern and the second sensor line grid pattern form a dual layer conductive mesh, the first sensor line grid pattern and the second sensor line grid pattern being separated by the insulation substrate layer in a third direction perpendicular to the first direction and the second direction.

12. The display stack according to claim 11, wherein the second sensor line grid pattern is arranged adjacent to the cover layer, and the first sensor line grid pattern is arranged adjacent to the display panel layer.

13. The display stack according to claim 11, wherein the second sensor lines extend at least partially nonlinearly in the second direction such that distances between adjacent second sensor lines vary periodically along the second direction.

14. The display stack according to claim 11, wherein a non-linear section of the second sensor lines is at least diagonal, comprising at least two sections extending at an angle to the second direction, the angle preferably being 45°.

15. The display stack according to claim 14, wherein the non-linear sections of the first sensor lines comprise dummy areas isolating adjacent first sensor lines from each other, and/or the non-linear sections of the second sensor lines comprise dummy areas isolating adjacent second sensor lines from each other, the dummy area(s) being configured to accommodate millimeter wave antenna elements.

16. The display stack according to claim 1, wherein the display stack does not comprise a separate millimeter-wave antenna layer.

17. The display stack according to claim 1, further comprising a parasitic or coupled radiator layer arranged between the cover layer and the touch sensor panel layer, the radiator layer comprising transparent conductive mesh.

18. The display stack according to claim 1, wherein a section of the cover layer facing the touch sensor panel layer, is configured to accommodate the radiators of the millimeter wave antenna functionality.

19. An electronic device, comprising:
a display stack with millimeter-wave antenna functionality, the display stack comprising:
a plurality of adjoining layers, the layers comprising at least
a cover layer,
a display panel layer, and
a touch sensor panel layer comprising a touch sensor arrangement, wherein the touch sensor panel layer comprises:
a first sensor line grid pattern, the first sensor line grid pattern comprising a plurality of continuous first sensor lines, wherein each first sensor line is integral and uninterrupted as it extends, at least partially nonlinearly, across the first sensor line grid pattern, and
a second sensor line grid pattern, the second sensor line grid pattern comprising a plurality of continuous second sensor lines, wherein each second sensor line is integral and uninterrupted as it extends, at least partially nonlinearly, across the second sensor line grid pattern, wherein the first sensor lines form transmission lines of the touch sensor arrangement, the transmission lines extending substantially in a first direction, wherein the second sensor lines form receiver lines of the touch sensor arrangement, the receiver lines extending substantially in a second direction, wherein the first sensor lines and the second sensor lines are separated by an insulation substrate layer comprising a polymer film, and
wherein antenna sections including the receiver lines and the transmission lines are integral in the touch sensor arrangement; wherein each of the antenna sections including the receiver lines and the transmission lines connected to a feed line configured to function as radiators for the millimeter wave antenna functionality, wherein the receiver lines and the transmission lines are separated by the insulation substrate layer comprising the polymer film.

20. The electronic device according to claim 19, wherein the second direction extending at an angle>0° to the first direction.

* * * * *